US012761174B2

(12) United States Patent
Wright et al.

(10) Patent No.: US 12,761,174 B2
(45) Date of Patent: Oct. 13, 2026

(54) VARIABLE DETECTOR AMPLIFIER SETTLING TIME

(71) Applicant: THERMO ENVIRONMENTAL INSTRUMENTS LLC, Franklin, MA (US)

(72) Inventors: Robert Wright, Frodsham (GB); Nigel Johnson, Middlewich (GB)

(73) Assignee: Thermo Enviromental Instruments LLC, Franklin, MA (US)

(*) Notice: Subject to any disclaimer, the term of this patent is extended or adjusted under 35 U.S.C. 154(b) by 403 days.

(21) Appl. No.: 18/508,940

(22) Filed: Nov. 14, 2023

(65) Prior Publication Data

US 2024/0159699 A1 May 16, 2024

Related U.S. Application Data

(60) Provisional application No. 63/384,010, filed on Nov. 16, 2022.

(51) Int. Cl.
*G01N 27/623* (2021.01)
*G01N 27/12* (2006.01)
*G01N 27/64* (2006.01)

(52) U.S. Cl.
CPC ......... *G01N 27/122* (2013.01); *G01N 27/623* (2021.01); *G01N 27/64* (2013.01)

(58) Field of Classification Search
CPC ..... G01N 27/64; G01N 27/623; G01N 27/122
See application file for complete search history.

(56) References Cited

U.S. PATENT DOCUMENTS

| | | | | |
|---|---|---|---|---|
| 4,008,388 | A | 2/1977 | McLafferty et al. | |
| 8,073,635 | B2 * | 12/2011 | Thomson ............ | H01J 49/0009 702/23 |
| 8,680,461 | B2 * | 3/2014 | Rardin ................ | H01J 49/0031 250/281 |
| 9,431,976 | B2 | 8/2016 | Lerche | |
| 9,645,113 | B2 * | 5/2017 | Haramoto .............. | G01N 27/62 |

FOREIGN PATENT DOCUMENTS

WO WO-2018167449 A1 9/2018

OTHER PUBLICATIONS

PCT/US2023/079976, International Search Report and Written Opinion, Mar. 7, 2024, 15 pages.

* cited by examiner

*Primary Examiner* — Sean Luck

(57) ABSTRACT

A mass spectrometer system including a non-transitory computer readable medium is described. The non-transitory computer readable medium includes instructions, which, when executed by one or more hardware processors, cause the mass spectrometer to allow an amplifier current to settle, for a time determined by a threshold current, between generating signals due to an ion current from the mass spectrometer's detector.

21 Claims, 4 Drawing Sheets

VARIABLE DETECTOR AMPLIFIER SETTLING TIME

FIELD OF THE INVENTION

This invention is directed to mass spectrometer systems and methods. In particular, a mass spectrometer having a detector amplifier with a variable settling time is described.

BACKGROUND OF THE INVENTION

Mass spectrometry is a mature technology and mass spectrometers and systems have been developed for the analysis of a wide variety of samples. All mass spectrometers include at least three components; an ion source, a mass filter, and a detector. Neutral atoms and molecules are converted into charged gas-phase ions by the ion source and various methods are used to extract and accelerate the charged species into an ion beam. The ion beam is sent through the mass filter which separates the ions according to mass-to-charge (m/z) ratios. The filtered ions are directed to a detector which generates an ion current for each group ions. The ion currents are then amplified by an amplifier.

The amplifiers used for amplification of ion currents can require a settling time between monitoring of different m/z species. Without allowing the amplifier to settle, carry over ion current from a preceding m/z species impinging on the detector can cause an erroneous high ion current to be attributed to the subsequent m/z species. The amplifier settling time can vary between each measurement of m/z species since it depends on the intensity or amount of a particular m/z species giving rise to the ion currents. One way to correct for this carry over effect is to allow the detector to settle for a fixed time. This allows the detector signal, without an m/z species impinging on the detector and causing an ion current, to decay to a background noise value. However, this is not optimal since the fixed time may be too short, causing the carry over errors, or the fixed time may be too long, lengthening the measurement time.

There is therefore an unmet need to optimize detection of ions by mass spectrometry.

SUMMARY

Systems, methods, and products to address these and other needs are described herein with respect to illustrative, non-limiting, implementations. Various alternatives, modifications and equivalents are possible.

According to a first aspect, a system is described. The system includes a mass spectrometer comprising a mass filter and a current amplifier coupled to a detector. The current amplifier comprises an amplifier current. The system also includes a non-transitory computer readable medium coupled to or included with the mass spectrometer, the non-transitory computer readable medium comprising instructions. When the instructions are executed by one or more hardware processors, they cause the mass spectrometer to do the following: send an ion beam through the mass filter; set the mass filter to a $1^{st}$ mass filter setting, thereby focusing a $1^{st}$ subset of ions from the ion beam onto the detector; generate a $1^{st}$ signal proportional to the $1^{st}$ subset of ions focused onto the detector; set the mass filter to a 2nd mass filter setting, thereby focusing a 2nd subset of ions from the ion beam onto the detector; allow the amplifier current to settle for a time determined by a threshold current; generate a 2nd signal proportional to the 2nd subset of ions focused onto the detector; generate mass/charge to ion intensity data using the $1^{st}$ and 2nd mass filter settings and the corresponding $1^{st}$ and 2nd signals.

According to a second aspect, a method of measuring mass distributions in a sample is described. The method includes: sending an ion beam through a mass filter; setting the mass filter to a $1^{st}$ mass filter setting, thereby focusing a $1^{st}$ subset of ions from the ion beam onto a detector; generating a $1^{st}$ signal proportional to the $1^{st}$ subset of ions focused at the detector; setting the mass filter to a 2nd mass filter setting, thereby focusing a 2nd subset of ions from the ion beam onto the detector; allowing an amplifier current to settle for a second time determined by a threshold; generating a 2nd signal proportional to the 2nd subset of ions focused at the detector; and generating mass/charge to ion intensity data using the $1^{st}$ and 2nd mass filter settings and the corresponding $1^{st}$ and 2nd signals.

According to a third aspect, a non-transitory computer readable medium comprising instructions is described which, when executed by one or more hardware processors, cause performance of operations described according to the second aspect.

The mass spectrometer system, methods and non-transitory computer readable medium provides an optimized detection using mass spectrometry. For example, reducing the time for measurement of several species in a sample.

BRIEF DESCRIPTION OF THE DRAWINGS

The foregoing and other features and advantages of the present embodiments will be more fully understood from the following detailed description of illustrative embodiments taken in conjunction with the accompanying drawings.

Figure 1:
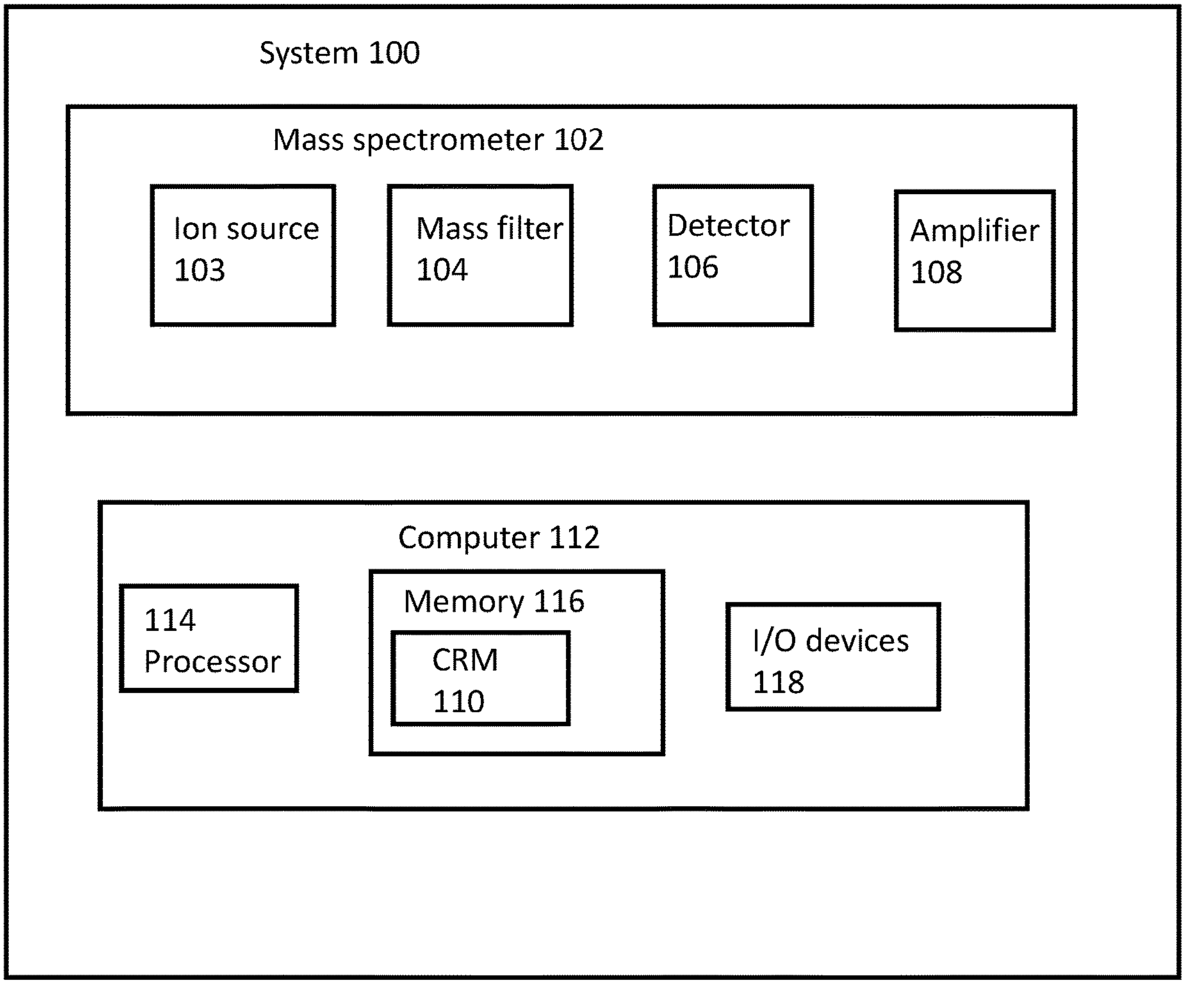
FIG. 1 is a block diagram of a system, according to some implementations.

The figures referred to above are not drawn necessarily to scale, should be understood to provide a representation of particular embodiments, and are merely conceptual in nature and illustrative of the principals involved. The same reference numbers are used in the drawings for similar or identical components and features shown in various alternative embodiments.

DETAILED DESCRIPTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the statistical dispersion found in their respective testing measurements.

FIG. 1 is block diagram illustrating some components of a mass spectrometer system 100, according to some implementations. The system includes a mass spectrometer 102 and a non-transitory computer readable medium 110, implemented in a computer system 112.

The mass spectrometer 102 includes an ion source 103, a mass filter 104 and a detector 106. The detector 106 is coupled to a current amplifier 108. The current amplifier 108 includes an amplifier current.

Neutral atoms and molecules of a sample are converted into ions by the ion source 103. The ion source 103 includes an inlet or source for the neutral sample species. In some implementations, the sample is injected directly with minimal preparation, such as where an ambient or process gas that is sampled may be filtered to remove particulates and/or diluted with an inert (i.e. non-reactive to the species of interest) gas. In other implementations, the sample is sourced from a coupled instrument, such as a chromatography system (e.g., HPLC, GC). In other implementations, the sample is combined to form a matrix, such as for Matrix-Assisted Laser Desorption/ionization (MALDI).

A typical ion source 103 can be an Electron Ionization (EI) source, an example of a specific type is as described in U.S. Pat. No. 6,885,010, which is hereby incorporated by reference in its entirety. Other ion sources can be implemented, such electrospray ionization (ESI), Chemical. Ionization (CI), Atmospheric Pressure Chemical Ionization (APCI), and MALDI. Electrodes and ion guides extract the ions from the ion source and form these into an ion beam that is directed through the mass filter 104.

The mass filter 104 (sometimes referred to as a mass analyzer) separates or filters the ions according to mass-to-charge (m/z) ratios. Most commonly the ions are positively charge ions (cations), although some implementations can use negatively charged ions (anions). The specific mechanism for mass filtration depends on the type of mass filter 104 used. For example, in a magnetic sector mass spectrometer, the ions are sent through a magnetic sector flight tube, where they are separated by their m/z ratio in a magnetic field of variable strength generated by an electromagnet. In a quadrupole mass spectrometer the ions are separated by their m/z ratio based on a variable electric field provided by the quadrupole.

The filtered ions are directed to the detector 106 which generates an ion current in response to the ions impinging or focused onto a detecting element of the detector 106. In some implementations, the detector 106 is a faraday cup detector. In some other implementations, the detector 106 is a micro channel plat (MCP) detector, also known as a secondary electron multiplier detector. In some implementations, the mass spectrometer 102 includes two or more detectors 106 that can be independently selected for analysis.

The current amplifier 108 amplifies the ion current. Ion currents provided by the detector 106 can be extremely small and require amplification for further processing. For example, in some implementations the ion current can be in the range of between about $10^{-16}$ and $10^{-9}$ amps. One way to amplify such signals is to use a transimpedance amplifier. Transimpedance amplifiers include an operational amplifier and a feedback resistor Rf that is connected between the inverting input of an operational amplifier and the output of the operational amplifier. In an ideal case, the transimpedance amplifier will amplify the amplifier current (I), and convert it into a low impedance output Voltage (V): in accordance with equation I:

$$V=IR_f.$$

Transimpedance amplifiers that are configured to operate with small or very small I in the pico-to femto-ampere range typically operate with a large feedback resistor Rf in the range of $10^9$ to 1014 ohms. Such large resistors exhibit a self-capacitance that causes the amplifier current to decay slowly when the source, such as an ion current, is removed. In practice it is known to improve noisy signals by shunting Rf with a small capacitor in the range of 0.05-0.1 pF, although this added small capacitor is not always needed or used. There can also be some capacitance due to other components that are part of or connected to the amplifier. Therefore, there is an equivalent capacitance C* that accounts for all capacitance producing elements associated with the current amplifier 108. Accordingly, the amplifier current (I) and decay time (t) after the ion current Ic is removed, can be described by equation II:

$$t=R_f C^* \text{In}(I_c/I).$$

Figure 2:
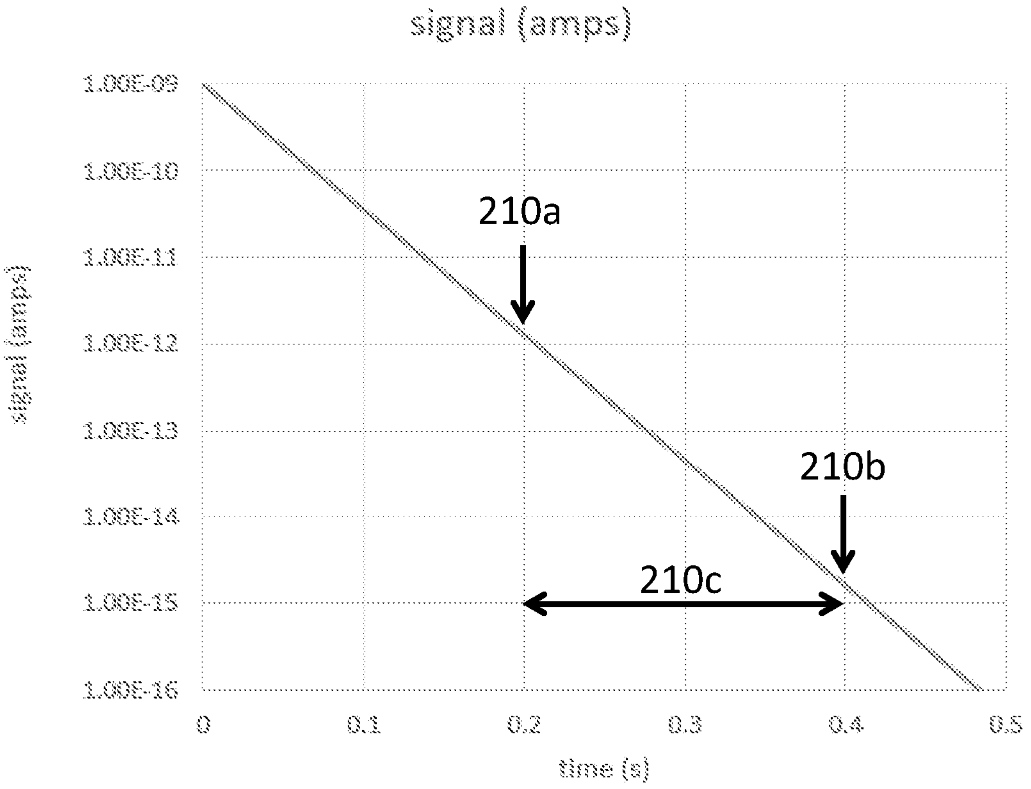
FIG. 2 is a plot showing a signal decay vs time for a current amplifier, according to some implementations.

FIG. 2 is a natural log plot of a predicted amplifier current (I) decay. The plot uses an estimated value of C* of $3\times10^{-12}$ farads and an Rf of $10^{-10}$ ohms. The capacitance is estimated by observing the carry over current and by considering other factors such as components and type of mass spectrometer. In some implementations, C* is determined from an equivalent circuit analysis of the current amplifier 108. In some implementations, C* is calculated by measuring the signal decay vs time and solving for C* in equation II. $R_f C$ is the RC time constant for the current amplifier 108. If Ic is known the time t to reach this target amplifier current can be determined.

The amplifier current is a variable current and can include the ion current from the detector 106, background current from the detector 106, background current from amplifier 108, as well as the decay current, such as that described above by equation II. Thus, the amplifier current can have different, and large, values in response to different ions producing an ion current at the detector 106, a low amplifier current that is considered the background noise when no ions impinge on the detector 106, and the decay current between these values. The magnitude of the ion current is proportional to the number of ions impinging on the detector 106. The level of the background noise can depend on the components in the detector 106 as well as factors such as temperature and electrical isolation.

In some implementations, the current amplifier includes a known amplifier current decay profile. Although other decay profiles are contemplated, such as decay profiles including two or more exponential decay time constants, in some implementations the current amplifier 108 has an RC equivalent circuit and the know decay profile corresponds to the RC equivalent circuit current decay profile, such as described above with reference to equation II. In some implementations, the resistor $R_f$ of the RC circuit is between $10^9$ ohms and $10^{11}$ ohms. In some implementations, the equivalent capacitor C* of the RC circuit is between $10^{-13}$ farads and $10^{-11}$ farads.

Returning to FIG. 1, the system 100 includes a computer system 112. The computer system 112 includes subcomponents such as a hardware processor 114, a memory 116, and Input/output (I/O) devices 118. The hardware processor 114 can include more than one device, such as a CPU and microprocessors. The hardware processor 114 executes commands stored in the memory 116. Memory 116 can include dynamic storage devices such as random-access memory (RAM), static memory such as read only memory (ROM). Memory 116 also includes the non-transitory computer readable medium 110. In some implementations, at least some of the subcomponents can be physically combined into one unit distinct from the mass spectrometer 102. In some implementations, at least some of the subcomponents are physically integrated with the mass spectrometer 102.

The non-transitory computer readable medium 110 refers to any non-transitory media that store data and instructions that cause the mass spectrometer system 100 to operate in a specific fashion. Such non-transitory media may comprise non-volatile media and/or volatile media. Non-volatile media includes, for example, optical or magnetic disks. Volatile media includes dynamic memory, such as RAM. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM). The non-transitory computer readable medium can be read to one of the other memories included in memory 116 for storage or execution by hardware processor 114.

The I/O devices 118 can include devices to output information, such as a monitor, printer, or indicator lights and alarms. The I/O device can also include devices to input commands such as a keyboard or other keys and buttons, a mouse or other cursor control device, and a microphone for verbal command. The I/O devices can also include a communication interface for two-way communication to a local network, a remote server, or the cloud. The two-way communication can include wireless and/or hardwired coupling.

The various components in the mass spectrometer 102 and the computer system 112 are coupled to each other so they can operate as a system. For example, one or more components can be electrically coupled by wires and contacts. One or more components can also be coupled wirelessly. The coupling can be direct or through other components, such as a BUS within the computer system 112 which can also be coupled to the mass spectrometer 102, such as through microcontrollers in the mass spectrometer 102. In addition, central power, such as from mains power or a battery, can be distributed through a network throughout the system 100 to power the various components. Local, separate power sources can also be used for mass spectrometer 102 and computer system 112, or any of the components therein.

In addition to communicating and receiving commands locally to run the system 100, in some implementation the I/O device 118 can be connected to a larger system, such as a control or monitoring system for a manufacturing plant. For example, the system 100 can be included in a Process Analysis Technology (PAT) system, such as for monitoring a bioreactor. In such an implementation, for example, the I/O device 118 can receive data and instructions from other process monitoring devices (e.g., a temperature sensor or a pH meter, or an instruction to take a measurement), or the I/O device 118 can send instructions to the PAT system, such as an instruction to add nutrients or heat to the bioreactor. As another example implementation, the system 100 can be a part of a gas flare monitoring system where the I/O device 118 can send signals or instructions such as to sound an alarm signal or to shut off a valve to the gas flare monitoring system.

Figure 3:
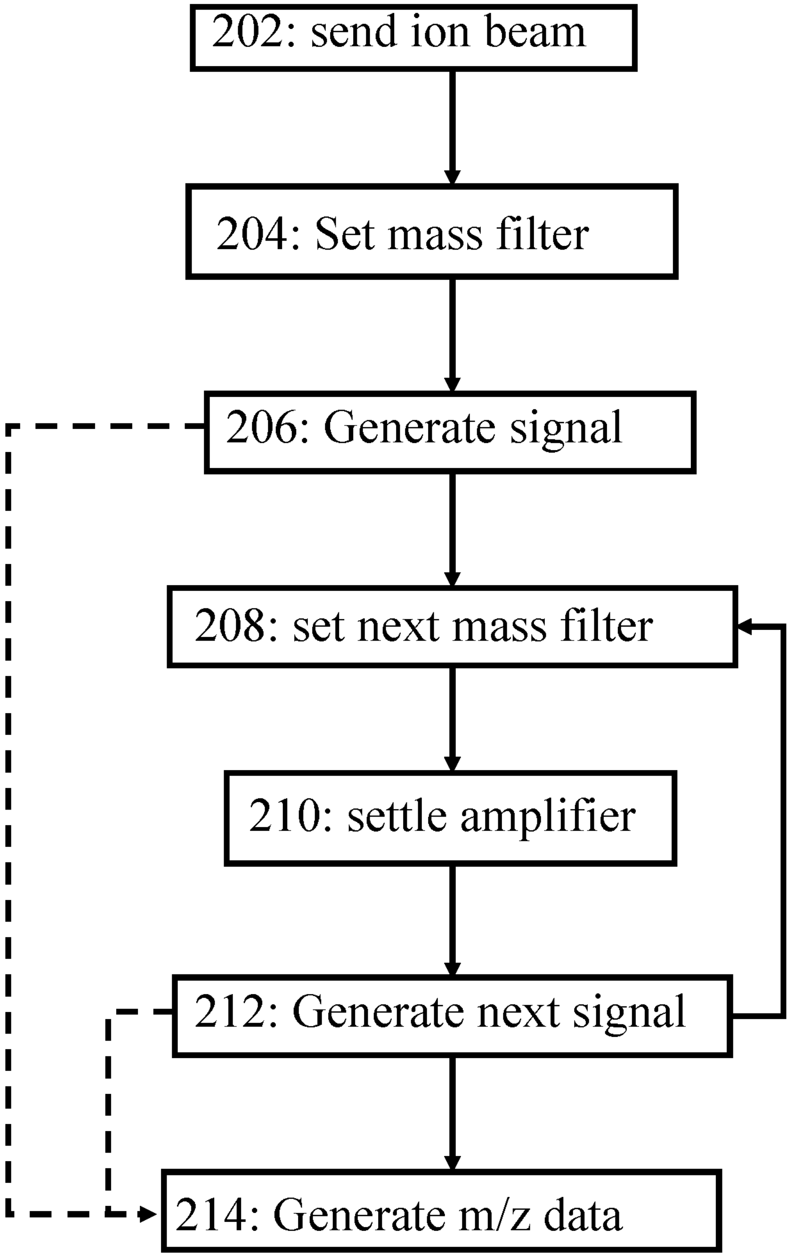
FIG. 3 is a flow diagram showing steps executed for measuring mass distributions in a sample, according to some implementations.

The non-transitory computer readable medium 110 includes instructions that can be executed by one or more hardware processors 114. For example, the processor 114 can send electrical signals or data to microcontrollers or other devices to cause the mass spectrometer 102 to perform a sequence of events as dictated by the instructions. The instructions include causing the mass spectrometer 102 to execute the steps as depicted in FIG. 3.

Instruction 202 is to send the ion beam through the mass filter 104. It is understood that to be effective, preceding instruction such as providing a sample to the ion source 103 and provide an ionizing current to ionize the sample, are also sent to the ion source 103. The ion beam is sent through the mass filter 104 continuously while steps 204, 206, 210 and 212 are performed. In some implementations, Instructions 202, or a preceding or following instructions, such as immediately preceding or immediately following, includes monitoring the amplifier output signal, such as a settling current or the background current (background noise).

Instruction 204 is to set the mass filter 104 to a setting, such as a $1^{st}$ mass filter setting. This mass filter setting focuses a subset of the ions, such as a $1^{st}$ subset of ions, from the ion beam onto the detector 106. This causes an ion current, such as a $1^{st}$ ion current, to be generated.

Instruction 206 is to generate a signal, such as a $1^{st}$ signal, that is proportional to the subset (e.g. the $1^{st}$ subset) of ions focused onto the detector 106. The ion current (e.g. the $1^{st}$ ion current) is amplified by the current amplifier 108 to provide the signal (e.g. the $1^{st}$ signal). For example, in implementations using a transimpedance amplifier, the $1^{st}$ signal can be the voltage output generated by the $1^{st}$ ion current. In some implementations, Instruction 206 is immediately followed by Instruction 214, which is discussed below. In some implementations, Instruction 206 includes an instruction to start collecting data and an instruction to stop collecting data causing sampling of the amplifier current between the start and stop instruction. In some implementations, the generated signal is an averaged value of the sampled amplifier current between the time the start and stop instructions are given. In another implementation, the instruction to start collecting data or the instruction to stop collecting data causes a physical element, such as a switch between the detector 106 and current amplifier 108 to open or close. Such a physical element connects the detector 106 to the current amplifier 108 and data is collected, and the physical element disconnects the detector 106 from the current amplifier 108 to stop data collection.

Instruction 208 is to set the mass filter to another, next or $2^{nd}$ mass filter setting. This next mass filter setting focuses a next, such as a $2^{nd}$, subset of ions from the ion beam onto the detector 106. This causes another, the next or the $2^{nd}$ ion current to be generated.

Instruction 210 is to allow the amplifier current to settle for a time, such as a first time, determined by a threshold current. For example, the amplifier current will decay from the $1^{st}$ ion current according to its circuit design which determines the decay characteristics. Instruction 210 can be implemented by determining the expected time for the amplifier to reach the threshold current. For example, using the RC decay depicted by FIG. 2, if the $1^{st}$ ion current is $1\times10^{-12}$ amps (210*a*), and the threshold is $1\times10^{-15}$ (210*b*), the instruction 210 is to wait for about 0.2 seconds (210*c*) before proceeding to the next step. Thus, the amplifier current is not directly monitored or used, rather the decay model for the current is used to determine the time needed to achieve the desired threshold for the amplifier current. The threshold current in some implementations is never actually reached by the amplifier current, such as when the threshold current much lower than the background noise level for the amplifier current. In some implementations, the amplifier current is allowed to settle to the background noise level prior to setting the mass filter to the $1^{st}$ mass filter setting.

Instruction 212 is to generate another, next or $2^{nd}$ signal that is proportional to the next, such as the $2^{nd}$, subset of ions focused onto the detector 106. The ion current (e.g. the $2^{nd}$ ion current) is amplified by the current amplifier 108 to provide this next signal (e.g. the $2^{nd}$ signal). In some implementations, Instruction 212 includes the instruction to start collecting data and stop collecting date as previously described for Instruction 206. In some implementations, the generated signal is an averaged value of the sampled amplifier current between the time the start and stop instructions are given. In another implementation, the start collecting data or stop collecting data causes actuation of a physical element, such as a switch, as previously described for Instruction 206. In some implementations, Instruction 212 is immediately followed by instruction 214, which is discussed below.

Instruction 214 is to generate m/z to ion intensity data using the mass filter settings, such as the $1^{st}$ and the $2^{nd}$ mass filter settings, and the corresponding generated signals, such as the $1^{st}$ and $2^{nd}$ signals. The mass filter settings identify a specific species from the sample associated with its m/z, while the generated signal is proportional to or derived from the ion current and therefore the concentration of the specific species. In some implementations, the m/z to ion intensity data is output as species concentrations of the sample. In some implementations, the m/z ion intensity data is sent to a process monitoring system. For example, the system 100 can be used as a gas analyzer for flare gas analysis or for monitoring a bioreactor, such as for monitoring hydrocarbons (e.g. methane), Sulfur dioxide, carbon dioxide, carbon monoxide, amines, and nitrogen oxides.

Figure 4:
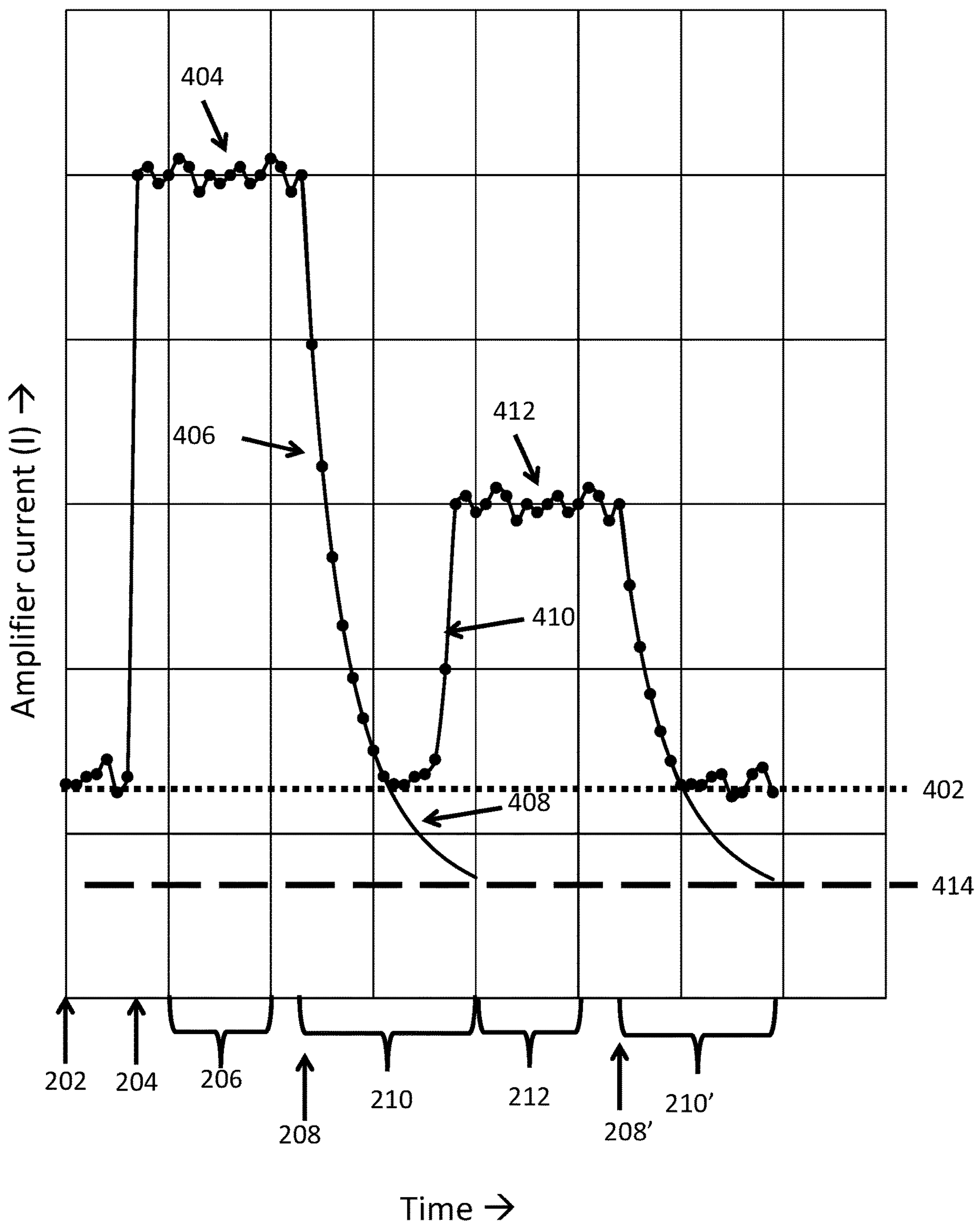
FIG. 4 is a graph showing amplifier and amplifier current, according to some implementations.

FIG. 4 illustrates some of the steps shown in FIG. 3 referencing an amplifier current plot according to an implementation. The plot shows an amplifier current vs time with the instructions shown as they occur along the time axis. Prior to the instruction 202 to send the ion beam through the mass filter 104, the current amplifier 108 is turned on and an amplifier current settles at the background noise level 402, indicated by the dotted line. Initially, when the ion beam is turned on or created, only background noise is detected since no ions are yet focused on the detector 106. Instruction 204 to set the mass filter 104 to a setting, such as the $1^{st}$ mass filter setting, causes the $1^{st}$ subset of ions to focus on the detector 106 and the amplifier current shoots upward until it reaches a plateau due to the $1^{st}$ ion current 404, with some background noise superimposed. The instruction 206 to generate the first signal is then given. The instruction 206 lasts for an interval of time that is within the time period when the $1^{st}$ ion current 404 is being generated by the detector 108. The instruction 206 can be shorter than the entire time the $1^{st}$ ion current 404 is being generated and is bounded by the start collecting data and stop collecting data instruction previously described. The instruction 206 retrieves this ion current which is amplified by the amplifier, such as to generate a voltage value that can then be further transformed to a concentration of the ions. When the instruction 208 to set the mass filter to another, next or $2^{nd}$ mass filter setting is received by the mass spectrometer 102, the amplifier current due to the $1^{st}$ ion current decays along 406 and can reach the background noise level 402. In an alternative implementation, the amplifier current does not reach the background noise level since while the amplifier current due to the $1^{st}$ ion current decays along 406, the amplifier current due to the next, such as the $2^{nd}$, subset of ions focused onto the detector 106, rises up along 410 until it reaches a plateau due to the $2^{nd}$ ion current 412. That is, in this alternative implementation, the amplifier current can start rising and relaxes down to the background noise level 402 between the plateaus 404 and 412.

In FIG. 4, a calculated decay curve 408 is also shown, which is hidden under the current decay 406 except where it is shown below the background noise level 402.

Instruction 210 allows the amplifier current to settle below the threshold current 414 by waiting for the time it takes for the calculated decay curve 408 to intersect with the threshold current 414. After this time, the instruction 212 to generate the second signal is sent. Similar further instructions are sent, such as an instruction 208' to set the mass filter 104 to the next (e.g., a $3^{rd}$) mass filter setting and an instruction 210' to allow the amplifier current to settle below the threshold 414. The threshold current 414 can be selected at any level 402, such as below, at or above the background noise level 402. In some implementations, the threshold current 414 is different between measurements of ion current, so that there are a plurality of threshold currents 414, such as a $1^{st}$ threshold after the $1^{st}$ ion current is generated, a $2^{nd}$ threshold after the $2^{nd}$ ion current is generated, a third threshold after the $3^{rd}$ ion current is generated, etc.

Note that as depicted in FIG. 4, the time, such the first time, associated with instruction 210 is longer than the time, such as the second time, associated with instruction 210'. This occurs because the $1^{st}$ ion current 404 is higher than the $2^{nd}$ ion current 412, and therefore it takes longer for the amplifier current to decay from the $1^{st}$ ion current 404 than from the $2^{nd}$ ion current 412.

In some implementations, the instructions include a sequence of mass filter commands, where the $1^{st}$ mass filter setting, and the $2^{nd}$ mass filter setting are set according to the sequence of mass filter commands. For example, a $1^{st}$ mass filter command sends the instruction 204 to set the mass filter 104 to the $1^{st}$ filter setting, and a $2^{nd}$ mass filter command sends the instruction to 208 set the mass filter 104 to the $2^{nd}$ mass filter setting. The sequence can include additional mass filter commands such as a $3^{rd}$, 4th, 5th, etc. mass filter setting, each providing a corresponding instruction to set $3^{rd}$, 4th, 5th etc. mass filter settings. In some implementations between 2 and 100 mass filter commands (e.g. between 2 and 50, between 5 and 20) are included in the sequence of mass filter commands. This is depicted by the arrow connecting instruction 212 and instruction 208, which iterates the instructions 208, 210 and 212 until the sequence of mass filter commands have been executed. Thus in some implementations, the instructions cause the mass spectrometer 102 to: set the mass filter to a $3^{rd}$ mass filter setting thereby focusing a $3^{rd}$ subset of ions from the ion beam onto the detector; allow the amplifier current to settle for a time determined by the threshold current; generate a $3^{rd}$ signal proportional to the $3^{rd}$ subset of ions focused at the detector; and generate mass/charge to ion intensity data using the $3^{rd}$ mass filter setting and the corresponding $3^{rd}$ signal.

In some implementations, the mass filter 104 requires some time to stabilize. For example, electromagnets used in magnetic sector mass spectrometers can take a significant amount of time to settle to a stable magnetic field (e.g., within 0.01% above and below the target magnetic field). In such implementations, the mass filter 104 is allowed to stabilize before any ion current is amplified by the current amplifier 108 to provide a signal. In some implementations, the mass filter 104 set at the $1^{st}$ mass filter setting is allowed to stabilize prior to generating the $1^{st}$ signal; the mass filter 104 set at the $2^{nd}$ mass filter setting is allowed to stabilize prior to generating the $2^{nd}$ signal; and the mass filter 104 set at the $3^{rd}$ mass filter setting is allowed to stabilize prior to generating the $3^{rd}$ signal.

In some implementations, the threshold current is equal to or below one standard deviation of the amplifier current. That is, the amplifier current varies due to background noise equal to three standard deviations of the signal. In some implementations the threshold current is equal to or below 0.1 standard deviation of the amplifier current. In some implementations, the threshold is equal to or below 3 standard deviations of the amplifier current.

The threshold current can also be selected to be above the background noise level (3 standard deviations). For example, while this may cause some carry over ion current to the subsequent or next ion current, it will also shorten the time for analysis since the time for the amplifier current to settle to the threshold current would be shorter. Thus, there is a balance of shortening the measurement of many different m/z species, and precision of the measurements that is taken into consideration.

In some implementations the threshold current is selected by a user or by another machine or system connected to the system 100. The threshold can be selected by the user using I/O device, such as a keyboard and monitor.

In some implementations, the time, such as the first time or the second time, for the amplifier current to settle is between 0.01 seconds and 1 second. The time delay here corresponds to the time between which subsequent signals are generated at each mass filter setting. For example, the time delay between generating the $1^{st}$ signal and generating the $2^{nd}$ signal. In some implementations, the mass filter 104 takes longer to settle than the current amplifier 108. In such instances the time delay is substantial due only to the settling of the mass filter 104. For example, when a magnetic field of a magnetic sector mass spectrometer is ~ 13-switched to the next mass filter setting, the field can take 0.1 to 0.2 seconds to stabilize. If the amount of ion current due to the previous measurement is low, the time calculated for the amplifier current to decayed to below the threshold current might can be less than the time it takes for the magnetic field to settle. In such instances, the next signal can be generated immediately.

In some implementations, the mass spectrometer is a magnetic sector mass spectrometer, the mass filter comprises a magnetic sector flight tube, the $1^{st}$ mass filter setting is a $1^{st}$ magnetic field, and the $2^{nd}$ mass filter setting is a $2^{nd}$ magnetic field. In some implementations, the mass spectrometer is a quadrupole mass spectrometer, the mass filter comprises a quadrupole mass filter, the $1^{st}$ mass filter setting causes a $1^{st}$ quadrupolar electric field, and the $2^{nd}$ mass filter setting causes a $2^{nd}$ quadrupolar electric field setting.

The Table shows an implementation using an RC equivalent circuit to calculate time delays between two ion currents due to different ion beams associated with two different masses. This shows that with a 30 ms RC time constant the reading at mass 30.5 has settled out. Therefore, the system 100 can select 30 ms, or longer, to ensure that the measurement of the mass 30.5 will not have any carry over current form mass 28.

TABLE

Experiment showing different RC time constants.

| | | Ion current (amps) | |
|---|---|---|---|
| | | mass 28 | mass 30.5 |
| no additional delay (no algorithm) | average | 4.48E−10 | 1.02E−14 |
| | st dev | 4.65E−13 | 1.21E−15 |
| delay calculated and implemented | average | 4.48E−10 | 8.47E−15 |
| using 20 ms RC time constant | st dev | 1.69E−13 | 1.13E−15 |
| delay calculated and implemented | average | 4.47E−10 | 6.88E−15 |
| using 30 ms RC time constant | st dev | 1.23E−13 | 1.17E−15 |
| delay calculated and implemented | average | 4.47E−10 | 6.44E−15 |
| using 50 ms RC time constant | st dev | 2.09E−13 | 1.28E−15 |
| delay calculated and implemented | average | 4.48E−10 | 6.39E−15 |
| using 100 ms RC time constant | st dev | 1.14E−13 | 1.23E−15 |

The following numbered paragraphs 1-21 provide various examples of the embodiments disclosed herein.

Paragraph 1. A system (100) comprising: a mass spectrometer (102) comprising a mass filter (104), and a current amplifier (108) coupled to a detector (106), wherein the current amplifier (108) comprises an amplifier current; and a non-transitory computer readable medium (110) coupled to or included with the mass spectrometer (102), the non-transitory computer readable medium (110) comprising instructions, which, when the instructions are executed by one or more hardware processors (112), cause the mass spectrometer (102) to: send (202) an ion beam through the mass filter 104; set (204) the mass filter to a $1^{st}$ mass filter setting, thereby focusing a $1^{st}$ subset of ions from the ion beam onto the detector; generate (206) a $1^{st}$ signal proportional to the $1^{st}$ subset of ions focused onto the detector; set (208) the mass filter to a $2^{nd}$ mass filter setting, thereby focusing a $2^{nd}$ subset of ions from the ion beam onto the detector; allow (210) the amplifier current to for a first time determined by a threshold current; generate (212) a $2^{nd}$ signal proportional to the $2^{nd}$ subset of ions focused onto the detector; generate (214) mass/charge to ion intensity data using the $1^{st}$ and $2^{nd}$ mass filter settings and the corresponding $1^{st}$ and $2^{nd}$ signals.

Paragraph 2. The system according to paragraph 1, wherein the instructions include a sequence of mass filter commands, wherein the $1^{st}$ mass filter setting, and the $2^{nd}$ mass filter setting are set according to the sequence of mass filter commands.

Paragraph 3. The system according to paragraph 1 or paragraph 2, wherein: a $1^{st}$ ion current is generated by the $1^{st}$ subset of ions focused onto the detector and the $1^{st}$ ion current is amplified by the current amplifier to provide the $1^{st}$ signal; and a $2^{nd}$ ion current is generated by the $2^{nd}$ subset of ions focused onto the detector and the $2^{nd}$ ion current is amplified by the current amplifier to provide the $2^{nd}$ signal.

Paragraph 4. The system according to any of paragraphs 1-3 further comprising allowing the mass filter 104 set at the $1^{st}$ mass filter setting to stabilize prior to generating the $1^{st}$ signal, and allowing the mass filter 104 set at the $2^{nd}$ mass filter setting to stabilize prior to generating the $2^{nd}$ signal.

Paragraph 5. The system according to any of paragraphs 1-4, wherein the instructions further cause the mass spectrometer to: set the mass filter to a $3^{rd}$ mass filter setting thereby focusing a $3^{rd}$ subset of ions from the ion beam onto the detector; allow the amplifier current to settle for a second time determined by the threshold current; generate a $3^{rd}$ signal proportional to the $3^{rd}$ subset of ions focused at the detector; and generate mass/charge to ion intensity data using the $3^{rd}$ mass filter setting and the corresponding $3^{rd}$ signal.

Paragraph 6. The system according to paragraph 5 further comprising allowing the mass filter set at the $2^{nd}$ mass filter setting to stabilize prior to generating the $3^{rd}$ signal.

Paragraph 7. The system according to any of paragraphs 1-6, wherein the mass/charge to ion intensity data is output as species concentrations.

Paragraph 8. The system according to any of paragraphs 1-7, wherein the mass/charge to ion intensity data is sent to a process monitoring system.

Paragraph 9. The system according to any of paragraphs 1-8, wherein the current amplifier includes a known amplifier current decay profile.

Paragraph 10. The system according to any of paragraphs 1-9, wherein the current amplifier has an RC equivalent circuit and the know decay profile corresponds to the RC equivalent circuit current decay profile.

Paragraph 11. The system according to paragraph 10, wherein an equivalent resistor of the RC circuit is between $10^{9}$ ohms and $10^{11}$ ohms.

Paragraph 12. The system according to paragraph 10 or 11, wherein an equivalent capacitor of the RC circuit is between $10^{-13}$ farads and $10^{-11}$ farads.

Paragraph 13. The system according to any of paragraphs 1-12, wherein the threshold current is equal to or below one standard deviation of the amplifier current.

Paragraph 14. The system according to any of paragraphs 1-13, wherein the threshold current is selected by a user.

Paragraph 15. The system according to any of paragraphs 1-14, wherein the first time is between 0.01 seconds and 1 second, and the system according to paragraph 5 wherein the second time is between 0.01 seconds and 1 second.

Paragraph 16. The system according to any of paragraphs 1-15 further comprising allowing the amplifier current to a background current prior to setting the mass filter to the $1^{st}$ mass filter setting.

Paragraph 17. The system according to any of paragraphs 1-16, wherein the mass spectrometer is a magnetic sector mass spectrometer, the mass filter comprises a magnetic sector flight tube, the $1^{st}$ mass filter setting is a $1^{st}$ magnetic field, and the $2^{nd}$ mass filter setting is a $2^{nd}$ magnetic field.

Paragraph 18. The system according to any of paragraphs 1-17, wherein the mass spectrometer is a quadrupole mass spectrometer, the mass filter comprises a quadrupole mass filter, the $1^{st}$ mass filter setting is a $1^{st}$ quadrupolar electric field, and the $2^{nd}$ mass filter setting is a $2^{nd}$ quadrupolar electric field setting.

Paragraph 19. A method of measuring mass distributions in a sample, the method comprising: sending an ion beam through a mass filter; setting the mass filter to a $1^{st}$ mass filter setting, thereby focusing a $1^{st}$ subset of ions from the ion beam onto a detector; generating a $1^{st}$ signal proportional to the $1^{st}$ subset of ions focused at the detector; setting the mass filter to a $2^{nd}$ mass filter setting, thereby focusing a $2^{nd}$ subset of ions from the ion beam onto the detector; allowing an amplifier current to settle for a first time determined by a threshold current; generating a $2^{nd}$ signal proportional to the $2^{nd}$ subset of ions focused at the detector; and generating mass/charge to ion intensity data using the $1^{st}$ and $2^{nd}$ mass filter settings and the corresponding $1^{st}$ and $2^{nd}$ signals.

Paragraph 20. The method according to paragraph 21 further comprising: setting the mass filter to a $3^{rd}$ mass filter setting thereby focusing a $3^{rd}$ subset of ions from the ion beam onto the detector; allowing the amplifier current to for a second time determined by threshold current; generating a $3^{rd}$ signal proportional to the $3^{rd}$ subset of ions focused at the detector; generating mass/charge to ion intensity data using the $3^{rd}$ magnetic field and the corresponding $3^{rd}$ signal.

Paragraph 21. A non-transitory computer readable medium comprising instructions which, when executed by one or more hardware processors, cause performance of operations as recited in paragraph 19 or 20.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above implementation and examples but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A system (100) comprising:

a mass spectrometer (102) comprising a mass filter (104), and a current amplifier (108) coupled to a detector (106), wherein the current amplifier (108) comprises an amplifier current; and a non-transitory computer readable medium (110) coupled to or included with the mass spectrometer (102), the non-transitory computer readable medium (110) comprising instructions, which, when the instructions are executed by one or more hardware processors (112), cause the mass spectrometer (102) to:

send an ion beam through the mass filter (104);

set the mass filter (104) to a $1^{st}$ mass filter setting, thereby focusing a $1^{st}$ subset of ions from the ion beam onto the detector (106);

generate a $1^{st}$ signal proportional to the $1^{st}$ subset of ions focused onto the detector (106);

set the mass filter (104) to a $2^{nd}$ mass filter setting, thereby focusing a $2^{nd}$ subset of ions from the ion beam onto the detector (106);

allow the amplifier current to settle for a first time determined by a threshold current;

generate a $2^{nd}$ signal proportional to the $2^{nd}$ subset of ions focused onto the detector (106);

generate mass/charge to ion intensity data using the $1^{st}$ and $2^{nd}$ mass filter settings and the corresponding $1^{st}$ and $2^{nd}$ signals.

2. The system according to claim 1, wherein the instructions include a sequence of mass filter commands, wherein the $1^{st}$ mass filter setting, and the $2^{nd}$ mass filter setting are set according to the sequence of mass filter commands.

3. The system according to claim 1, wherein:

a $1^{st}$ ion current is generated by the $1^{st}$ subset of ions focused onto the detector and the $1^{st}$ ion current is amplified by the current amplifier to provide the $1^{st}$ signal; and a $2^{nd}$ ion current is generated by the $2^{nd}$ subset of ions focused onto the detector and the $2^{nd}$ ion current is amplified by the current amplifier to provide the $2^{nd}$ signal.

4. The system according to claim 1 further comprising allowing the mass filter (104) set at the $1^{st}$ mass filter setting to stabilize prior to generating the $1^{st}$ signal, and allowing the mass filter 104 set at the $2^{nd}$ mass filter setting to stabilize prior to generating the $2^{nd}$ signal.

5. The system according to claim 1, wherein the instructions further cause the mass spectrometer to:

set the mass filter to a $3^{rd}$ mass filter setting thereby focusing a $3^{rd}$ subset of ions from the ion beam onto the detector;

allow the amplifier current to settle for a second time determined by the threshold current;

generate a $3^{rd}$ signal proportional to the $3^{rd}$ subset of ions focused at the detector; and generate mass/charge to ion intensity data using the $3^{rd}$ mass filter setting and the corresponding $3^{rd}$ signal.

6. The system according to claim 5 further comprising allowing the mass filter set at the $2^{nd}$ mass filter setting to stabilize prior to generating the $3^{rd}$ signal.

7. The system according to claim 1, wherein the mass/charge to ion intensity data is output as species concentrations.

8. The system according to claim 1, wherein the mass/charge to ion intensity data is sent to a process monitoring system.

9. The system according to claim 1, wherein the current amplifier includes a known amplifier current decay profile.

10. The system according to claim 9, wherein the current amplifier has an RC equivalent circuit and the know amplifier current decay profile corresponds to the RC equivalent circuit current decay profile.

11. The system according to claim 10, wherein an equivalent resistor of the RC circuit is between $10^9$ ohms and $10^{11}$ ohms.

12. The system according to claim 10, wherein an equivalent capacitor of the RC circuit is between $10^{-13}$ farads and 10-11 farads.

13. The system according to claim 1, wherein the threshold current is equal to or below one standard deviation of the amplifier current.

14. The system according to claim 1, wherein the threshold current is selected by a user.

15. The system according to claim 1, wherein the first time is between 0.01 seconds and 1 second.

16. The system according to claim 1 further comprising allowing the amplifier current to settle to a background current prior to setting the mass filter to the $1^{st}$ mass filter setting.

17. The system according to claim 1, wherein the mass spectrometer is a magnetic sector mass spectrometer, the mass filter comprises a magnetic sector flight tube, the $1^{st}$ mass filter setting is a $1^{st}$ magnetic field, and the $2^{nd}$ mass filter setting is a $2^{nd}$ magnetic field.

18. The system according to claim 1, wherein the mass spectrometer is a quadrupole mass spectrometer, the mass filter comprises a quadrupole mass filter, the $1^{st}$ mass filter setting is a $1^{st}$ quadrupolar electric field, and the $2^{nd}$ mass filter setting is a $2^{nd}$ quadrupolar electric field setting.

19. A method of measuring mass distributions in a sample, the method comprising:

sending an ion beam through a mass filter;

setting the mass filter to a $1^{st}$ mass filter setting, thereby focusing a $1^{st}$ subset of ions from the ion beam onto a detector;

generating a $1^{st}$ signal proportional to the $1^{st}$ subset of ions focused at the detector;

setting the mass filter to a $2^{nd}$ mass filter setting, thereby focusing a $2^{nd}$ subset of ions from the ion beam onto the detector;

allowing an amplifier current to settle for a first time determined by a threshold current;

generating a $2^{nd}$ signal proportional to the $2^{nd}$ subset of ions focused at the detector; and generating mass/charge to ion intensity data using the $1^{st}$ and $2^{nd}$ mass filter settings and the corresponding $1^{st}$ and $2^{nd}$ signals.

20. The method according to claim 19 further comprising:

setting the mass filter to a $3^{rd}$ mass filter setting thereby focusing a $3^{rd}$ subset of ions from the ion beam onto the detector;

allowing the amplifier current to settle for a second time determined by the threshold current;

generating a $3^{rd}$ signal proportional to the $3^{rd}$ subset of ions focused at the detector;

generating mass/charge to ion intensity data using the $3^{rd}$ mass filter setting and the corresponding $3^{rd}$ signal.

21. A non-transitory computer readable medium comprising instructions which, when executed by one or more hardware processors, cause performance of operations as recited in claim 19.

* * * * *